United States Patent
Butman et al.

(10) Patent No.: US 7,149,434 B2
(45) Date of Patent: Dec. 12, 2006

(54) SYSTEM AND METHOD FOR OPTICAL COMMUNICATION

(75) Inventors: Jerry Butman, Rancho Palo Verdes, CA (US); Gabriel Lombardi, Redondo Beach, CA (US)

(73) Assignee: Mission Research Corporation, Torrance, CA (US)

( * ) Notice: Subject to any disclaimer, the term of this patent is extended or adjusted under 35 U.S.C. 154(b) by 573 days.

(21) Appl. No.: 10/107,528

(22) Filed: Mar. 25, 2002

(65) Prior Publication Data

US 2002/0181052 A1  Dec. 5, 2002

Related U.S. Application Data

(60) Provisional application No. 60/280,614, filed on Mar. 30, 2001.

(51) Int. Cl.
 *H04J 14/02* (2006.01)
 *H04B 10/04* (2006.01)

(52) U.S. Cl. .................................... 398/185; 398/91

(58) Field of Classification Search ............... 398/76, 398/79, 91, 115, 152, 185, 204
See application file for complete search history.

(56) References Cited

U.S. PATENT DOCUMENTS

| | | | |
|---|---|---|---|
| 5,227,908 A | 7/1993 | Henmi | 359/154 |
| 5,239,401 A * | 8/1993 | Olshansky | 398/194 |
| 5,424,863 A * | 6/1995 | Gertel | 398/152 |
| 5,532,857 A | 7/1996 | Gertel et al. | 359/154 |
| 5,596,436 A | 1/1997 | Sargis et al. | 359/132 |
| 5,844,934 A | 12/1998 | Lund | 375/200 |
| 6,115,162 A * | 9/2000 | Graves et al. | 398/116 |
| 6,118,566 A * | 9/2000 | Price | 398/194 |
| 6,486,986 B1 * | 11/2002 | Fuse | 398/186 |
| 6,850,710 B1 * | 2/2005 | Mells | 398/163 |

FOREIGN PATENT DOCUMENTS

JP  07046187 A  *  2/1995

* cited by examiner

Primary Examiner—Dalzid Singh
(74) Attorney, Agent, or Firm—TraskBritt

(57) ABSTRACT

A system and method for optical communication is disclosed comprising a transmitter configured to transmit a signal wherein a first channel is in a USB spectrum but not in an LSB spectrum; and a second channel is in an LSB spectrum but not in the USB spectrum; and wherein an unmodulated optical carrier is suppressed; and a receiver configured to receive the transmitted signal.

16 Claims, 9 Drawing Sheets

SYSTEM AND METHOD FOR OPTICAL COMMUNICATION

CROSS REFERENCE TO RELATED APPLICATIONS

This application claims priority to U.S. Provisional Patent Application No. 60/280,614 entitled OPTICAL VECTOR MODEM, filed Mar. 30, 2001, which is incorporated herein by reference for all purposes.

FIELD OF THE INVENTION

The present invention relates generally to optical communications. More specifically, a system and method for transmitting and receiving optical communication is disclosed.

BACKGROUND OF THE INVENTION

There is a growing need for an efficient data communications system. In optical communications, an optical carrier with an upper and a lower sideband is typically used. One method of optical communication utilizes only one of these sidebands of the optical carrier, leaving the remaining sideband unused. In another method, both sidebands can be employed to double the data carrying capacity. However, a problem with such a method is that each data stream typically occupies both sidebands. This mirroring of information from one sideband to the other may cause unnecessary distortion during transmission through the optical fiber.

What is needed is a system and method for optical communication, which optimizes the data carrying capacity while minimizing the distortion of the transmission in the optical fiber. The present invention addresses such needs.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
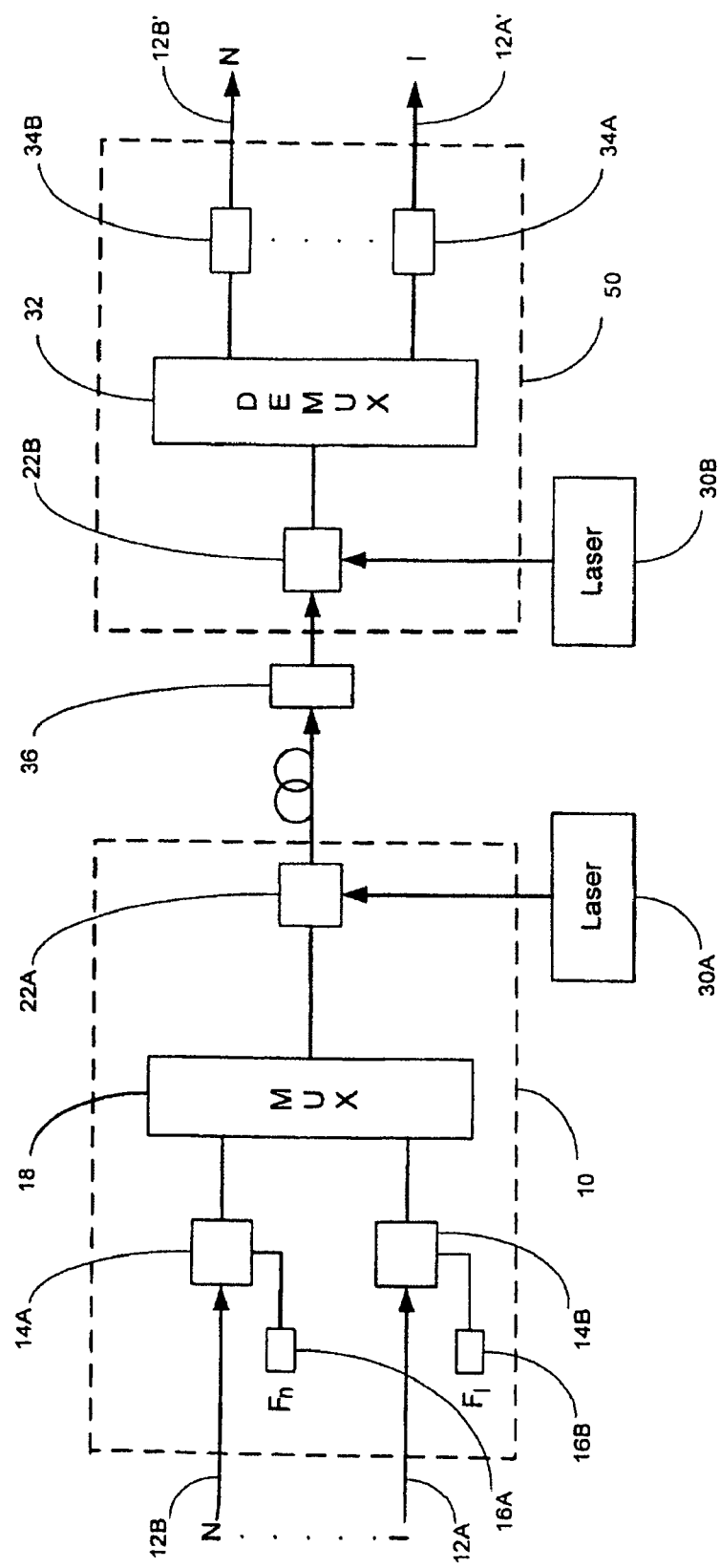
FIG. 1 is a block diagram of an example of a conventional optical communications system.

FIG. 1 is a block diagram of a conventional optical communication system. In this example, there is a transmitter 10, a receiver 50, and lasers 30A–30B. Data streams 12A–12B enter the transmitter and pass through RF modulators 14A–14B which are connected to RF oscillators 16A–16B. The modulated signals then enter multiplexer 18 and is multiplexed into a single stream destined for a single sideband, such as the upper sideband (USB) of the optical carrier. Thereafter, the signal moves through an optical modulator 22A. The signal is then transmitted to receiver 50 via optical fiber and polarization rotator 36 which typically adjusts the polarization of all channels with the same adjustment throughout. The adjusted signal then flows through optical detector 22B and is demultiplexed in demultiplexer 32. The demultiplexed signals flow through RF demodulators 34A–34B which then produce data streams 12A'–12B'.

Figure 2:
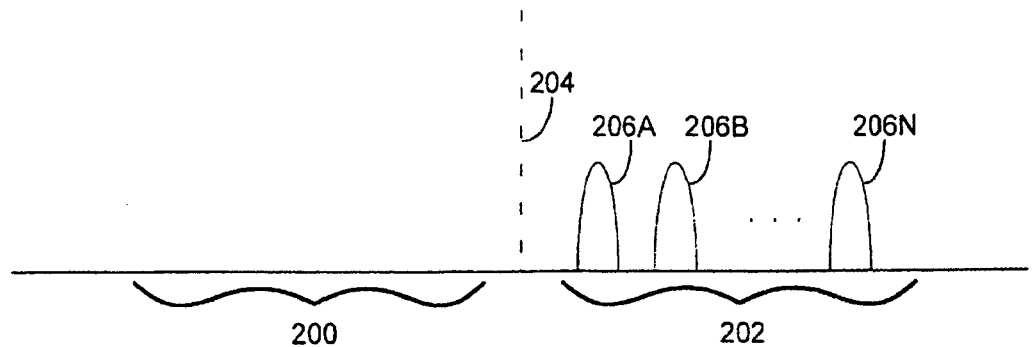
FIG. 2 is an example of a conventional optical signal.

FIG. 2 is an example of a conventional optical signal. Optical carrier 204 is shown to be flanked by upper sideband (USB) spectrum 202 and lower sideband (LSB) spectrum 200. In this example, only the USB spectrum 202 is utilized to carry channels 206A–206N. A problem with this conventional method is that an entire sideband region 200 is left unutilized.

Figure 3:
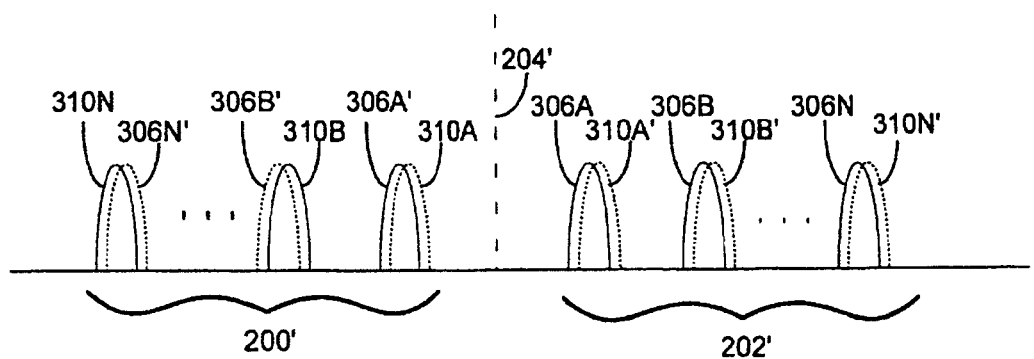
FIG. 3 is another example of a conventional optical signal.

FIG. 3 is another example of a conventional optical signal. In this example, both sidebands are utilized, however, each of the channels 306A–306N transmitted on the upper sideband 202' will typically be mirrored 306A'–306N' on the lower sideband 200'. Likewise, the information 310A–310N sent on the lower sideband 200' will also be mirrored 310A'–310N' on the upper sideband 202'. A problem with this conventional method is that the mirroring is likely to cause unnecessary distortion of the signal as it travels through the optical fiber.

Figure 4:
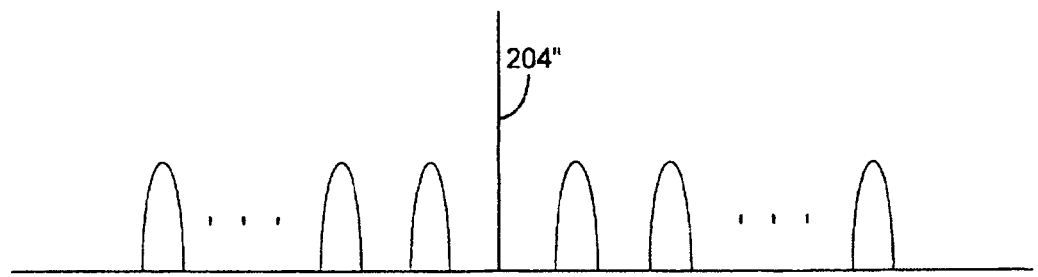
FIG. 4 is yet another example of a conventional optical signal.

FIG. 4 shows yet another example of a conventional optical signal. In this example, the unmodulated optical carrier 204" is transmitted along with the channels for use in aiding the heterodyne detection of the signal. A problem with this method is that it wastefully commits much of the transmit power to the unmodulated carrier 204" rather than the information bearing sidebands.

What is needed is a system and method of optical communication that allows utilization of both sidebands of the optical carrier without mirroring and without unnecessarily wasting the transmit power on the unmodulated carrier. The present invention addresses such needs.

Figure 5:
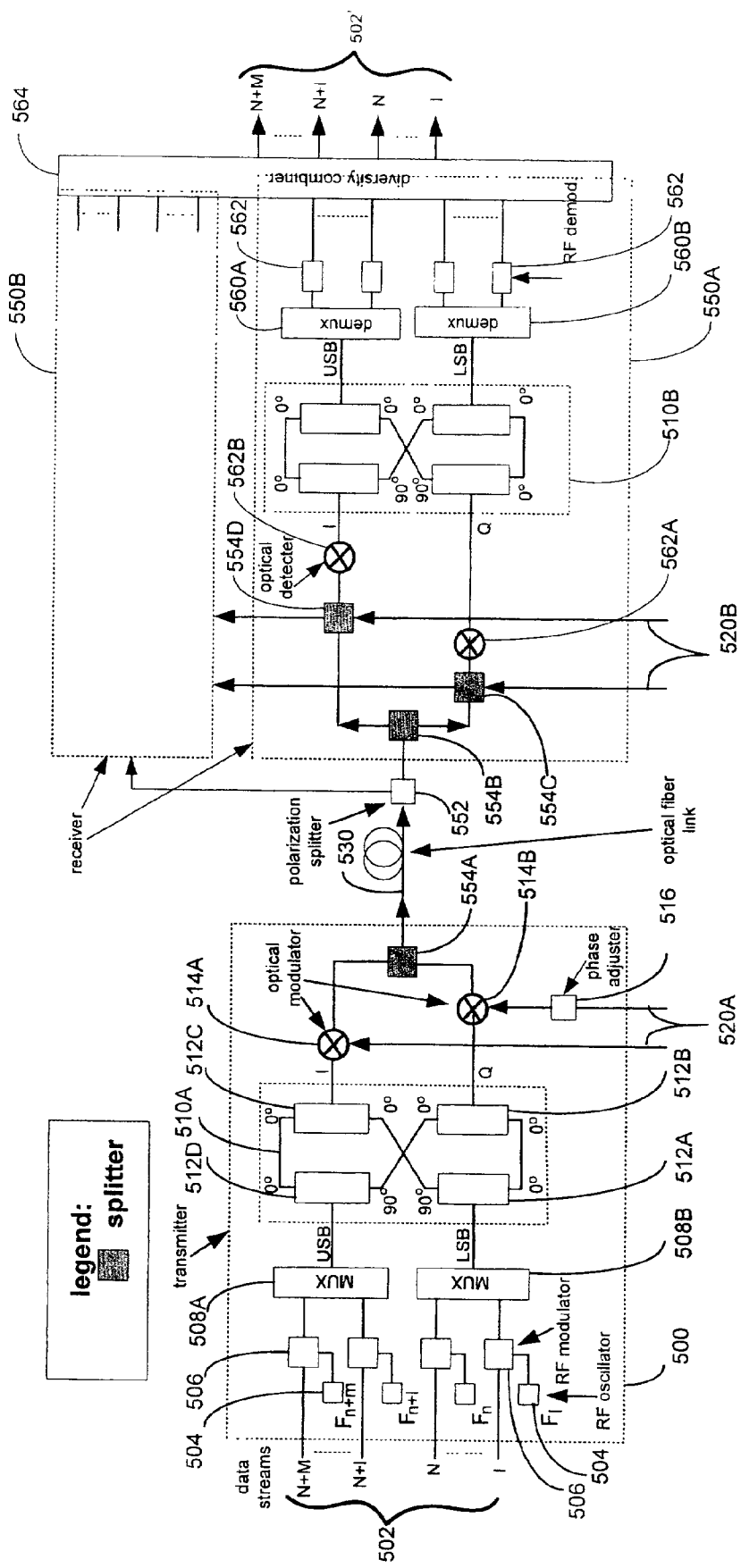
FIG. 5 is a block diagram of an optical communication system according to an embodiment of the present invention.

FIG. 5 is a block diagram of a system for optical communication with subcarrier multiplexing according to an embodiment of the present invention. In this example, data streams 502 enter transmitter 500. N+M independent data streams 502 in any electrical format can be accepted by the transmitter 500. Each data stream 502 is placed on a radio frequency subcarrier $f_k$ by an RF modulator 506 working in conjunction with RF oscillators 504. An example of the frequency range of the subcarrier includes 1 GHz–100 GHz. An example of the RF modulator 506 is the Marki Microwave, M01049, and an example of the RF oscillator 504 is the Princeton Microwave Technology, PmT-0200.

The modulated signals are then multiplexed by multiplexers 508A–508B. An example of multiplexers 508A–508B is M/A Com, 2089-6408-00. The modulated signals are multiplexed into two RF signals; one signal destined for the upper sideband (USB) and the other signal destined for the lower sideband (LSB) of the optical carrier. These signals enter the single sideband conditioner 510A. The single sideband conditioner 510A, as used herein, serves to place a channel on either the USB or LSB of an optical carrier, but not both. Accordingly, any component or combination of components that conditions a signal so that it appears either in the USB or LSB, but not both, can be used as a single sideband conditioner 510A. The term single sideband conditioner is also used herein to describe a component or a combination of components that serve to receive a channel from either the USB or LSB. In this example, the single sideband conditioner 510A is shown to include four RF splitters 512A–512D, which combine the signals into inphase (I) and quadrature (Q) signals. RF splitters 512A and 512D are 90 degree splitters, an example of which is M/A Com, part #2032-6374-00, while RF splitters 512C and 512B are 0 degree splitters, an example of which is the M/A Com, 2089-6208-00. Splitter 512D sends a portion of the USB signal to Q and a portion of the USB signal to I, while splitter 512A sends a portion of the LSB signal to I and a portion to Q. Splitters 512C and 512B combine the signals sent through splitters 512D and 512A. Accordingly, I and Q signals result from single sideband conditioner 510A.

In cases where the channels span a very wide bandwidth, such as greater than 20% of center frequency, it may sometimes be preferable to perform quadrature splitting in each channel prior to multiplexing, rather than first multiplexing and then quadrature splitting as described above. This alternate embodiment uses many more 90 degree splitters, such as ten to one hundred, than what is shown in FIG. 5, but the benefit is a reduced bandwidth requirement for each splitter, such as from 20% to 1% of center frequency. The result, Equations (3) and (4) below, is preferably obtained in either embodiment. If this alternate embodiment is used at the transmitter then, the corresponding operations should be performed at the receiver: demultiplex first and then do quadrature splitting in each channel, rather than first quadrature splitting and then demultiplexing.

Figure 6:
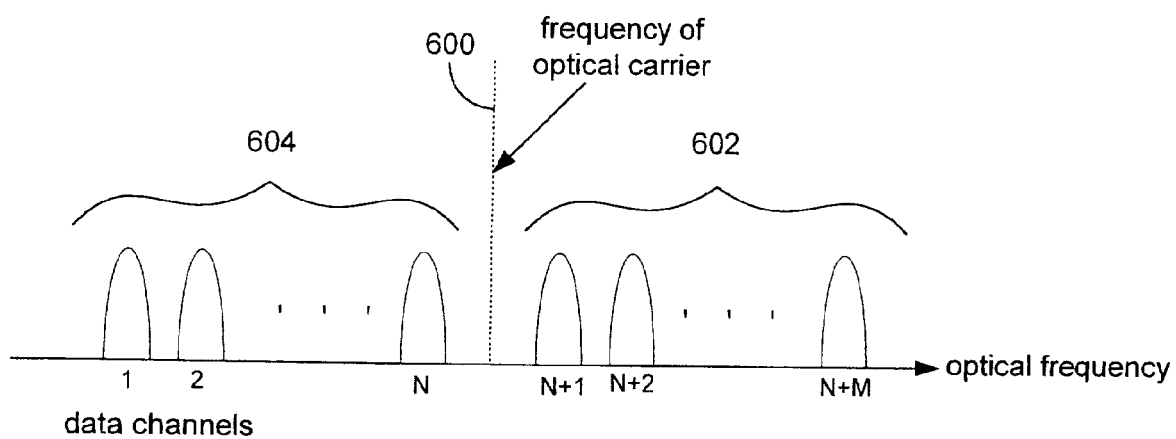
FIG. 6 is an example of a signal transmitted from the system and method according to an embodiment of the present invention.

Referring again to the embodiment shown in FIG. 5, the I and Q signals are used to drive optical modulators 514A and 514B. The I signal is modulated by laser signal 520A. Phase adjuster 516 modifies the phase of laser signal 520A. This phase-adjusted signal is used to modulate the Q signal. An example of such optical modulators are linear, bipolar, optical modulators, which modulate phase of the signal up to approximately 1 radian, such as Corning 10 Gb-s, part #790304804. A Mach-Zehnder modulator operated near the transmission null is an example of such an optical modulator. This type of modulation suppresses the unmodulated optical carrier. An example of the resulting modulated signal is shown in FIG. 6.

The modulated signals are combined through a splitter 554A and the combined signals are transmitted via an optical fiber 530.

The transmitted signal is received by a polarization splitter 552, which orthogonally separates the received signals into two polarizations. The initial polarizations are preferably irrelevant so long as the signals are separated into mutually orthogonal polarizations. One polarized signal is sent to receiver 550A, while the other polarized signal is sent to receiver 550B. The two receivers 550A and 550B are preferably identical. Only one receiver 550A is shown in detail for exemplary purposes. Although only one of the receivers 550A will be discussed, it is to be understood that the other signal will be processed in the same manner in receiver 550B. The received signal is split through splitter 554B. These received signals are heterodyned with a laser 520B, which acts as a local oscillator for heterodynes 554C and 554D. The received signals are heterodyned in two optical detectors 562A and 562B. An example of such a detector is the Newfocus 25 GHz diodes, model 1414. The relative optical phases of the local oscillators at the two optical detectors 562A–562B preferably differ by 90 degrees. The resulting I and Q signals enter the single sideband conditioner 510B in which the I and Q signals are combined, recovering the upper and lower sidebands. An example of the single sideband conditioner 510B is a Merrimac PDM-24 M-13G+M/A Com, 2089/6208/00.

The upper and lower sidebands are then demultiplexed via demultiplexer 560A–560B into the original M+N channels and demodulated via the RF demodulators 562. An example of such a demultiplexer is Merrimac MCL PS4-10 plus Quinstar RF filters.

The demodulated channels are then combined in the diversity combiner 564. The diversity combiner 564 can combine corresponding channels in various ways. For example, the diversity combiner 564 can add a channel coming from receiver 550A with a corresponding channel coming from receiver 550B. If the diversity combiner 564 combines the corresponding channels by adding them, then the RF modulator 506 of the transmitter 500 is preferred to be a bi-phase modulator. The RF demodulator 562 of receivers 550A–550B are preferred to be bi-phase differential demodulators. If it is desired to use more general modulators and corresponding demodulators, then the diversity combiner 564 preferably combines corresponding channels using the minimum mean square error algorithm.

Utilizing the diversity combiner 564 allows polarization rotation per individual channel. Unlike conventional systems, the diversity combiner 564, according to the present invention, allows polarization rotation of each channel independent of any other channel.

Alternatively, a simpler polarization rotator, such as JDS Uniphase Polarization Controller model 21001108, can be used with the system according to another embodiment of the present invention. The polarization rotator can adjust the polarization of the received signal prior to the signal entering the receiver 550A. If such a polarization rotator is used, the second receiver 550B, the polarization splitter 552, and the diversity combiner 564 will not be necessary to the system shown in FIG. 5. The polarization rotator can be used if the polarization rotation caused by the optical fiber 530 is the same across all the transmitted channels. If the rotation is different among the channels, then the embodiment using the diversity combiner 564 is preferred. The resulting data streams 502' (i.e., N+M, N+I, N, and I) correspond to the data streams 502 which were originally input into the transmitter 500.

FIG. 6 is an example of an optical communication signal according to an embodiment of the present invention. In this example, the signal includes optical carrier 600, upper sideband 602, and lower sideband 604. The advantages of the system and method according to the present invention includes transmission of data in both the upper sideband 602 and the lower sideband 604, wherein each of the data channels can include information independent of the other channels such that information transmitted in the upper sideband 602 may be different than the lower sideband 604. Accordingly, there is preferably no mirroring from one sideband to the other. Additionally, the signal shown in FIG. 6 preferably has the unmodulated carrier suppressed to avoid distortion of the signal and to optimize the power use.

Figure 7:
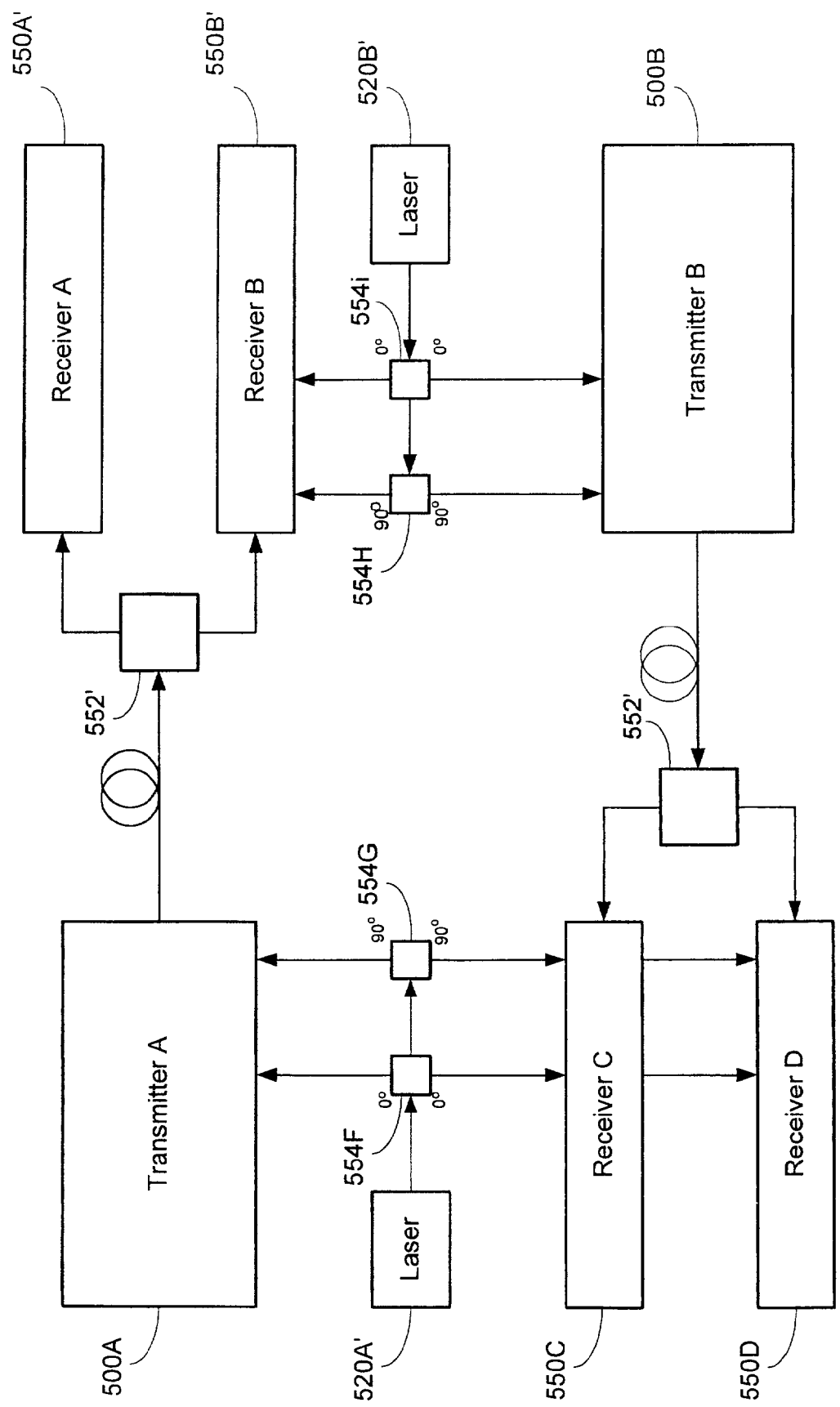
FIG. 7 is another block diagram of an embodiment of an optical communications system of the present invention.

FIG. 7 is a block diagram of a system according to another embodiment of the present invention for optical communications. In this embodiment, only a single laser 520A' is used for transmitter 500A, receiver 550C, and receiver 550D. Likewise, a single laser 520B' is used for transmitter 500B, receiver 550A', and receiver 550B'. Laser 520A' shoots a beam into splitters 554F–554G which split the beam for use by transmitter 500A and receivers 550C–D. Likewise, laser 520B' also splits its laser beam via splitters 554H–554I for use by transmitter 500B, and receivers 550A'–550B'. An example of such lasers 520A'–520B' is the Agilent 82662A.

Figure 8:
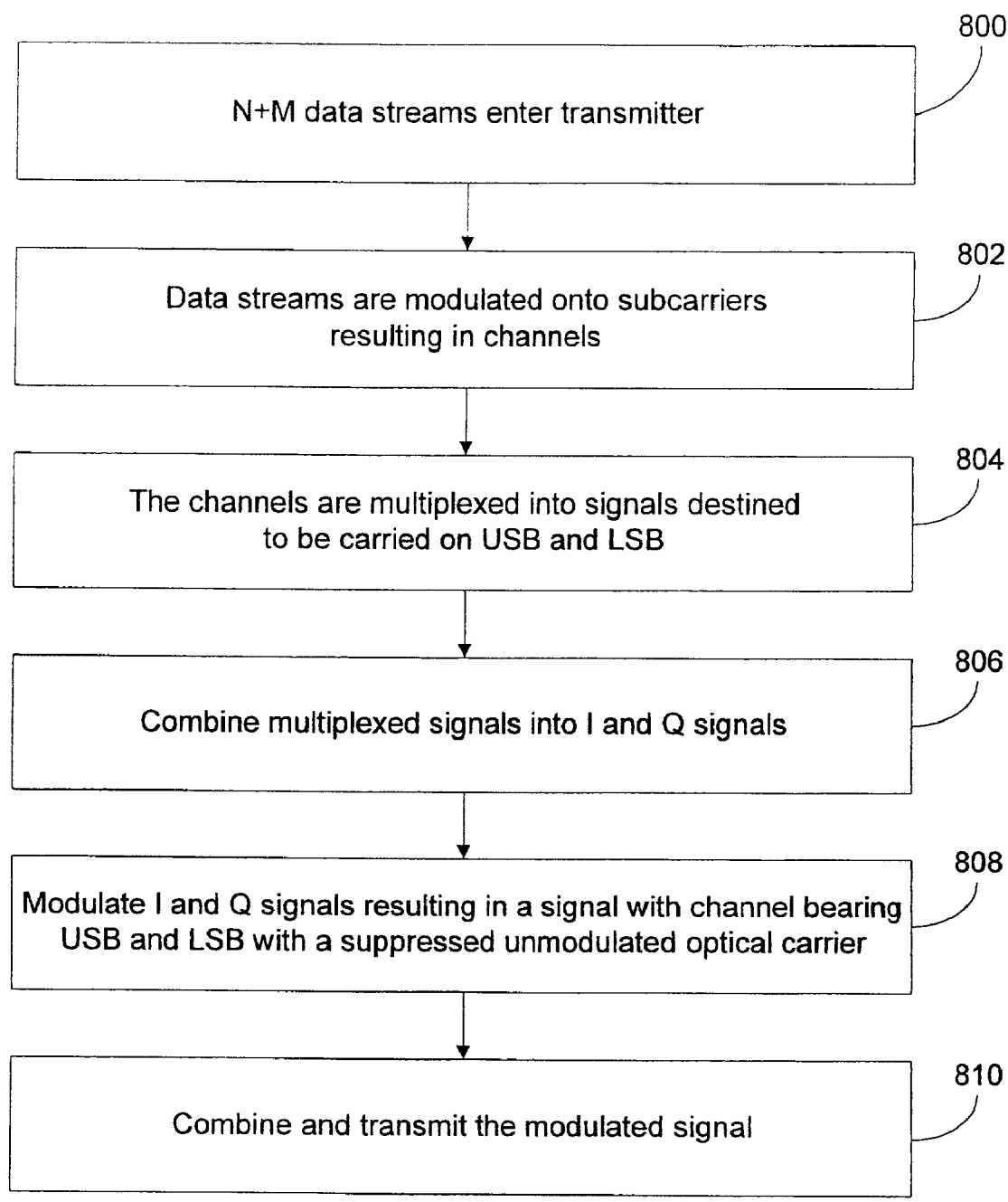
FIG. 8 is a flow diagram of a method for transmitting an optical signal according to an embodiment of the present invention.
Figure 9:
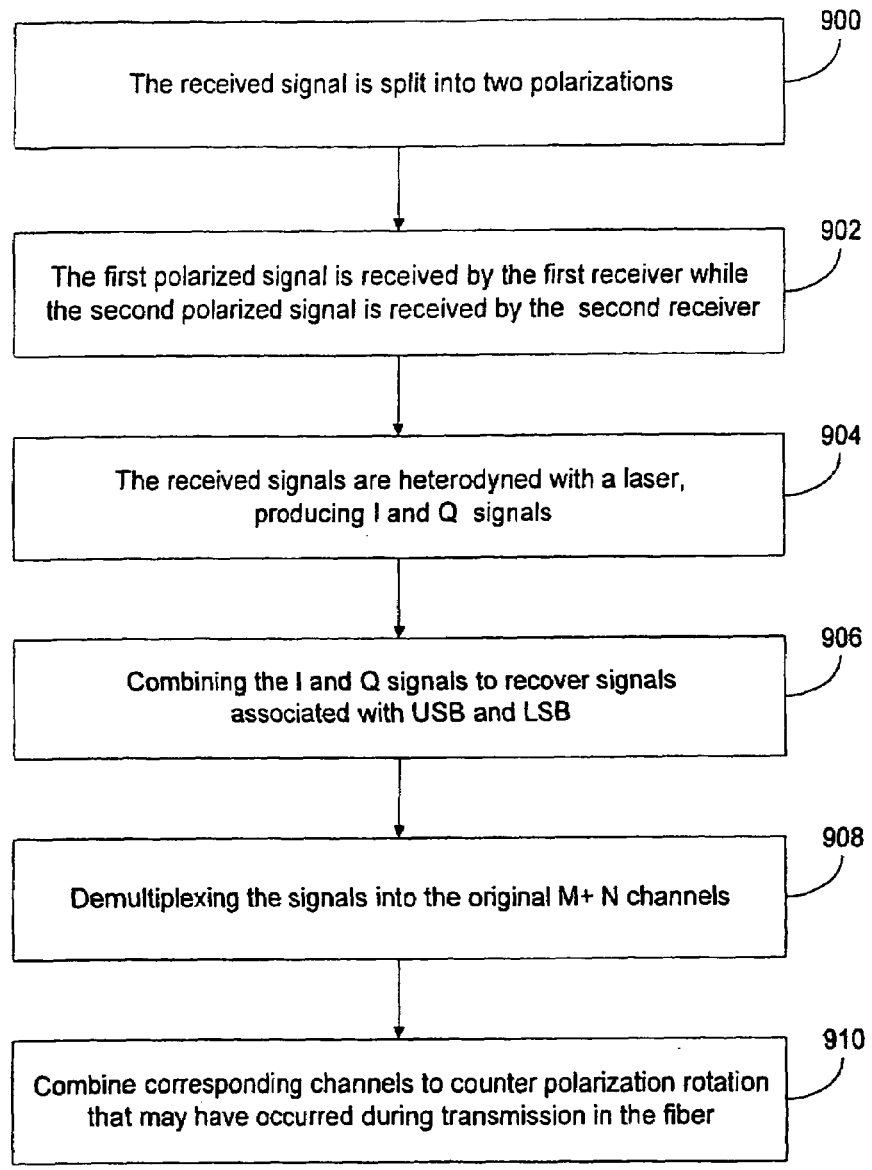
FIG. 9 is a flow diagram of a method for receiving an optical signal according to an embodiment of the present invention.
Figure 10:
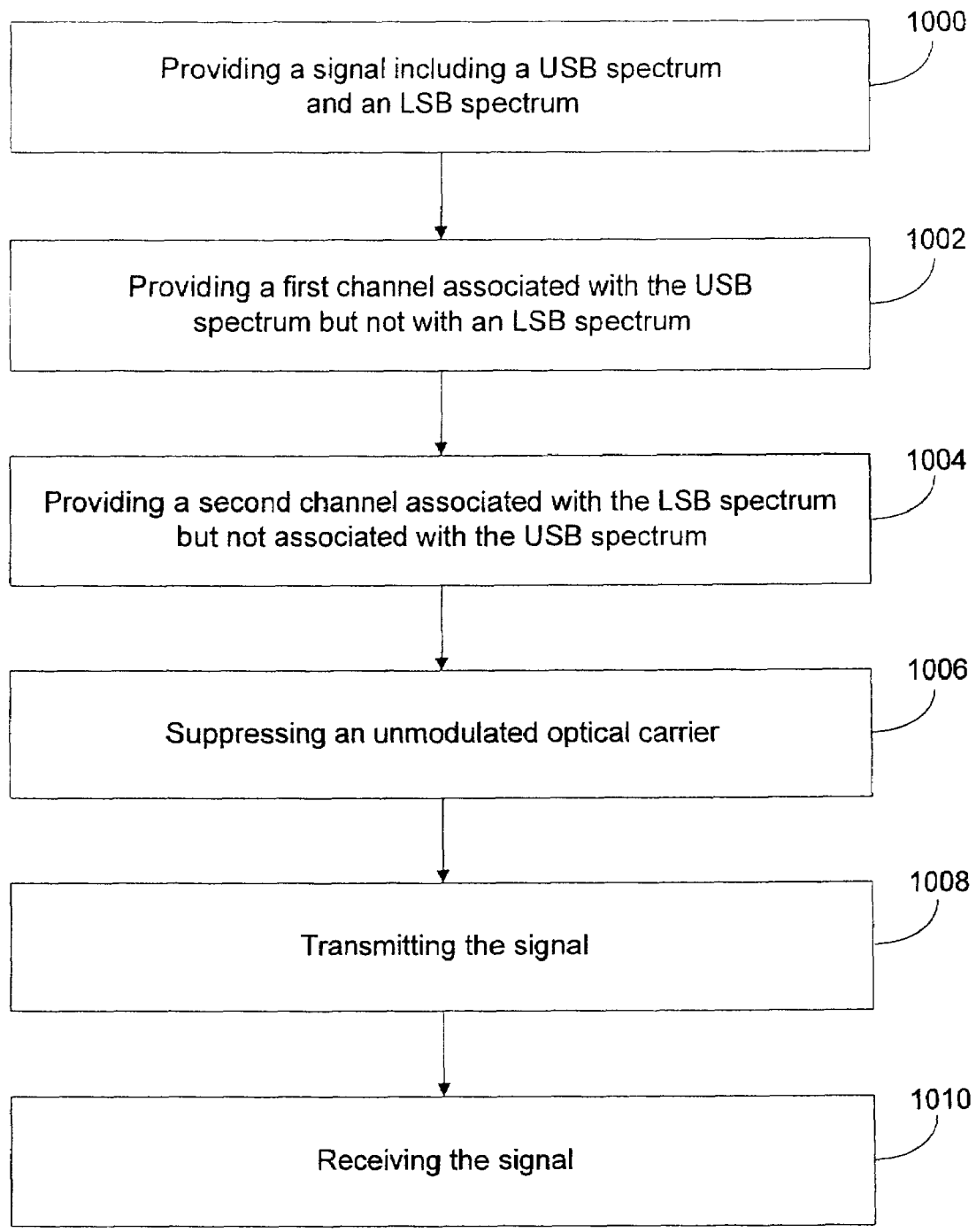
FIG. 10 is another flow diagram of a method for optical communication according to an embodiment of the present invention.

FIGS. 8–10 are flow diagrams of methods according to embodiments of the present invention. It should be recognized that these flow diagrams are examples of these methods and variations can occur. For example, the flow diagram steps may be reordered to achieve substantially the same results.

FIG. 8 is a flow diagram of a method for transmitting an optical communication signal according to an embodiment of the present invention. N+M data streams enter a transmitter (Step 800). These data streams are modulated onto subcarriers resulting in channels (Step 802). The channels are then multiplexed into signals destined to be carried on USB and LSB (Step 804). The USB and LSB are then combined into I & Q signals (Step 806). The I & Q signals are modulated, resulting in a signal with channel bearing USB & LSB with a suppressed unmodulated optical carrier (Step 808). The modulated signal is then combined and transmitted (Step 810).

FIG. 9 is a flow diagram of a method according to an embodiment of the present invention for receiving an optical communication signal. In this example, the received signal is split into two polarizations that are mutually orthogonal (Step 900). The first polarized signal is received by the first receiver, while the second polarized signal is received by the second receiver (Step 902). The received signals are heterodyned with a laser, producing I & Q signals (Step 904).

The I & Q signals are then combined to recover the signals associated with the USB and LSB (Step 906). The signals are then demultiplexed into the original M+N channels (Step 908). Corresponding channels produced by the first receiver and the second receiver are then combined to counter polarization rotation that may have occurred during transmission in the optical fiber (Step 910).

FIG. 10 is another flow diagram of a method for optical communication according to an embodiment of the present invention. In this example, a signal is provided which includes a USB spectrum and an LSB spectrum (step 1000). A first channel associated with the USB spectrum but not with the LSB spectrum is provided (step 1002). A second channel associated with the LSB spectrum but not with the USB spectrum is provided (step 1004). An unmodulated optical carrier is suppressed (step 1006). The signal is transmitted (step 1008). The transmitted signal is then received (step 1010).

Figure 11:
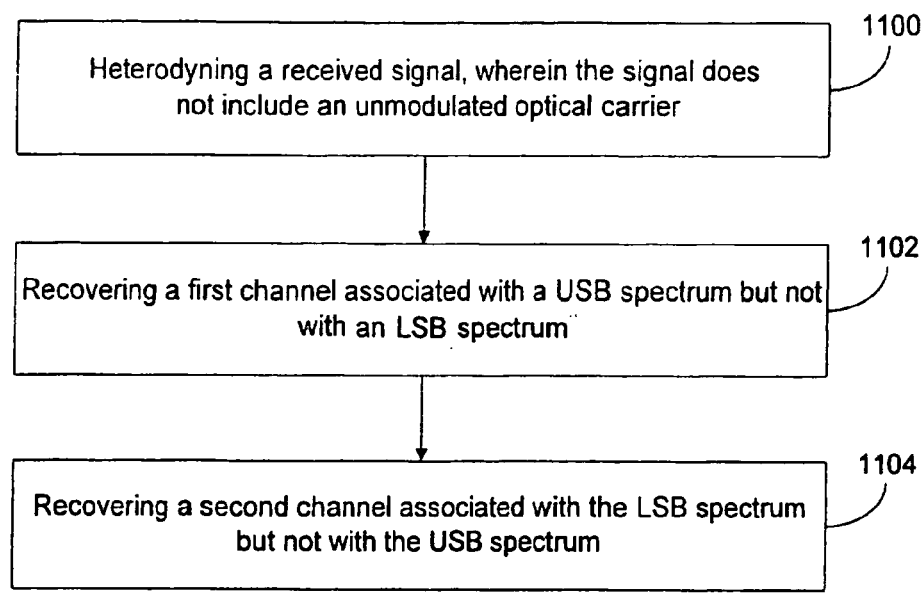
FIG. 11 is another flow diagram of a method for receiving an optical signal according to an embodiment of the present invention.

FIG. 11 is another flow diagram of a method for receiving an optical signal according to an embodiment of the present invention. In this example, a received signal is heterodyned, wherein the signal does not include an unmodulated optical carrier (step 1100). A first channel associated with a USB spectrum but not with an LSB spectrum is recovered (step 1102). A second channel associated with the LSB spectrum but not with the USB spectrum is recovered (step 1104).

The mathematical model for an embodiment of the system and method of the present invention is as follows:

The data channels are frequency multiplexed, resulting in the following USB and LSB signals:

$$LSB = \sum_{l=1}^{l=n} A_l \cos(f_l t + \varphi_l) \quad (1)$$

$$USB = \sum_{l=n+1}^{l=n+m} A_l \cos(f_l t + \varphi_l) \quad (2)$$

where the $f_l$ are the RF angular frequencies. Upon being combined into I and Q signals by the single sideband conditioner, the resulting signals are represented by:

$$I = \sum_{l=1}^{l=n} A_l \sin(f_l t + \varphi_l) + \sum_{l=n+1}^{l=n+m} A_l \cos(f_l t + \varphi_l) \quad (3)$$

$$Q = \sum_{l=1}^{l=n} A_l \cos(f_l t + \varphi_l) + \sum_{l=n+1}^{l=n+m} A_l \sin(f_l t + \varphi_l) \quad (4)$$

These I and Q signals are used to modulate in-phase and quadrature outputs of a laser acting as a local oscillator with optical frequency ω:

$$I' = \sum_{l=1}^{l=n} \{\sin\omega t\} A_l \sin(f_l t + \varphi_l) + \sum_{l=n+1}^{l=n+m} \{\sin\omega t\} A_l \cos(f_l t + \varphi_l) \quad (5)$$

$$Q' = \sum_{l=1}^{l=n} \{\cos\omega t\} A_l \cos(f_l t + \varphi_l) + \sum_{l=n+1}^{l=n+m} \{\cos\omega t\} A_l \sin(f_l t + \varphi_l) \quad (6)$$

When I' and Q' are combined $$I' + Q' = \sum_{l=1}^{l=n} \{\cos\omega t\} A_l \cos(f_l t + \varphi_l) + \{\sin\omega t\} A_l \sin(f_l t + \varphi_l) + \sum_{l=n+1}^{l=n+m} \{\sin\omega t\} A_l \cos(f_l t + \varphi_l) + \{\cos\omega t\} A_l \sin(f_l t + \varphi_l) \quad (7)$$

and simplified using $$\sin(A+B) = \sin A \cos B + \cos A \sin B \quad (8)$$

$$\cos(A-b) = \cos A \cos B + \sin A \sin B \quad (9)$$

the following signal is transmitted via optical fiber:

$$I' + Q' = \sum_{l=1}^{l=n} A_l \cos\{\omega t - (f_l t + \varphi_l)\} + \sum_{l=n+1}^{l=n+m} A_l \sin\{\omega t + (f_l t + \varphi_l)\} \quad (10)$$

Note the absence of any components at the carrier frequency, ω. Also note that the lower sideband terms, i.e., those in the first summation, are situated below ω. Conversely, the upper sideband terms of the second sum are situated above ω.

The received signals are mixed with the in-phase and quadrature outputs of a laser at the receiver.

$$I'' = \sum_{l=1}^{l=n} \{\sin\omega t\} A'_l \cos[\omega t - (f_l t + \varphi_l)] + \quad (11)$$

$$\sum_{l=n+1}^{l=n+m} \{\sin\omega t\} A'_l \sin[\omega t + (f_l t + \varphi_l)] =$$

$$\frac{1}{2}\sum_{l=1}^{l=n} A'_l [\sin(f_l t + \varphi_l) + \sin(2\omega t - f_l t - \varphi_l)] +$$

$$\frac{1}{2}\sum_{l=n+1}^{l=n+m} A'_l [\cos(f_l t + \varphi_l) - \cos(2\omega t + f_l t + \varphi_l)]$$

$$Q'' = \sum_{l=1}^{l=n} \{\cos\omega t\} A'_l \cos[\omega t - (f_l t + \varphi_l)] + \quad (12)$$

$$\sum_{l=n+1}^{l=n+m} \{\cos\omega t\} A'_l \sin[\omega t + (f_l t + \varphi_l)] =$$

$$\frac{1}{2}\sum_{l=1}^{l=n} A'_l [\cos(f_l t + \varphi_l) + \cos(2\omega t - f_l t - \varphi_l)] +$$

$$\frac{1}{2}\sum_{l=n+1}^{l=n+m} A'_l [\sin(f_l t + \varphi_l) + \sin(2\omega t + f_l t + \varphi_l)]$$

where the following identities have been used:

$$\sin A \cos B = \frac{1}{2}[\sin(A-B) + \sin(A+B)] \quad (13)$$

$$\cos A \cos B = \frac{1}{2}[\cos(A-B) + \cos(A+B)] \quad (14)$$

$$\sin A \sin B = \frac{1}{2}[\cos(A-B) - \cos(A+B)] \quad (15)$$

The optical detectors act as low pass filters, thus eliminating the optical terms containing $2\omega t$:

$$I'' = \frac{1}{2}\sum_{l=1}^{l=n} A'_l \sin(f_l t + \varphi_l) + \frac{1}{2}\sum_{l=n+1}^{l=n+m} A'_l \cos(f_l t + \varphi_l) \quad (16)$$

$$Q'' = \frac{1}{2}\sum_{l=1}^{l=n} A'_l \cos(f_l t + \varphi_l) + \frac{1}{2}\sum_{l=n+1}^{l=n+m} A'_l \sin(f_l t + \varphi_l) \quad (17)$$

The I″ and Q″ terms are combined in a single sideband conditioner, recovering the LSB′ and USB′ channels:

$$USB' = \frac{1}{2}\sum_{l=1}^{l=n} A'_l \sin(f_l t + \varphi_l) + \quad (18)$$

$$\frac{1}{2}\sum_{l=n+1}^{l=n+m} A'_l \cos(f_l t + \varphi_l) - \frac{1}{2}\sum_{l=1}^{l=n} A'_l \sin(f_l t + \varphi_l) +$$

$$\frac{1}{2}\sum_{l=n+1}^{l=n+m} A'_l \cos(f_l t + \varphi_l)$$

$$= \sum_{l=n+1}^{l=n+m} A'_l \cos(f_l t + \varphi_l)$$

$$LSB' = \frac{1}{2}\sum_{l=1}^{l=n} A'_l \cos(f_l t + \varphi_l) + \quad (19)$$

$$\frac{1}{2}\sum_{l=n+1}^{l=n+m} A'_l \sin(f_l t + \varphi_l) + \frac{1}{2}\sum_{l=1}^{l=n} A'_l \cos(f_l t + \varphi_l) -$$

$$\frac{1}{2}\sum_{l=n+1}^{l=n+m} A'_l \sin(f_l t + \varphi_l)$$

$$= \sum_{l=n}^{} A'_l \cos(f_l t + \varphi_l)$$

As stated above, the upper and lower sidebands are frequency demultiplexed and individually demodulated, resulting in the recovery of the original n+m data streams.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

The invention claimed is:

1. A system for optical communication, comprising:
   a first multiplexer configured to multiplex a first plurality of data channels onto a first data signal;
   a second multiplexer configured to multiplex a second plurality of data channels onto a second data signal;
   a transmitter configured to transmit a signal wherein information associated with the first data signal is modulated to a USB spectrum but not an LSB spectrum of an optical carrier; and information associated with the second data signal is modulated to the LSB spectrum but not the USB spectrum of the optical carrier; and wherein an unmodulated portion of the optical carrier is suppressed and is associated with the USB spectrum and the LSB spectrum; and a receiver configured to receive the transmitted signal.

2. The system of claim 1, wherein the transmitter further comprises a single sideband conditioner configured to condition a channel to appear in one of the LSB and the USB.

3. The system of claim 1, wherein the transmitter further comprises an optical modulator configured to suppress the unmodulated portion of the optical carrier.

4. The system of claim 1, further comprising a second receiver.

5. The system of claim 1, wherein the receiver further comprises a polarization splitter configured to send one of two polarizations to the receiver.

6. The system of claim 1, wherein the receiver further comprises an optical detector.

7. The system of claim 1, wherein the receiver further comprises a single sideband conditioner.

8. The system of claim 1, wherein the receiver further comprises a diversity combiner configured to combine corresponding channels.

9. A method for optical communication, comprising:
providing an optical carrier including a USB spectrum and an LSB spectrum;
providing a first data signal comprising a first plurality of data channels multiplexed onto the first data signal;
providing a second data signal comprising a second plurality of data channels multiplexed onto the second data signal;
suppressing an unmodulated portion of the optical carrier, wherein the unmodulated portion of the optical carrier is associated with the USB spectrum and the LSB spectrum;
transmitting the signal, wherein information associated with the first data signal is modulated to the USB spectrum but not the LSB spectrum, and information associated with the second data signal is modulated to the LSB spectrum but not the USB spectrum; and
receiving the signal.

10. The method of claim 9, wherein a first channel is multiplexed to be associated with the USB spectrum but not with the LSB spectrum.

11. The method of claim 9, wherein a first channel is combined into an I signal and a Q signal.

12. The method of claim 9, wherein the unmodulated portion of the optical carrier is suppressed by modulating an I signal and a Q signal.

13. The method of claim 9, wherein receiving the signal further comprises splitting the signal into two polarizations.

14. The method of claim 9, wherein receiving the signal further comprises receiving the signal with two receivers.

15. The method of claim 9, wherein receiving the signal further comprises heterodyning the signal with a laser.

16. The method of claim 9, wherein receiving the signal further comprises combining corresponding channels to counter polarization rotation.

* * * * *